US011978359B2

(12) United States Patent
Sundararajan et al.

(10) Patent No.: US 11,978,359 B2
(45) Date of Patent: May 7, 2024

(54) COMPUTER ENABLED MODELING FOR FACILITATING A USER LEARNING TRAJECTORY TO A LEARNING GOAL

(71) Applicant: International Business Machines Corporation, Armonk, NY (US)

(72) Inventors: Mukundan Sundararajan, Bangalore (IN); Jignesh K Karia, Thane (IN); Shilpa Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 17/301,297

(22) Filed: Mar. 31, 2021

(65) Prior Publication Data

US 2022/0319346 A1 Oct. 6, 2022

(51) Int. Cl.
*G09B 5/02* (2006.01)
*G09B 7/04* (2006.01)

(52) U.S. Cl.
CPC ..................... *G09B 7/04* (2013.01)

(58) Field of Classification Search
CPC ... G09B 5/02; G09B 5/04; G09B 5/06; G09B 7/02; G09B 7/04; G09B 7/06; G09B 7/063; G09B 7/066; G09B 7/07; G09B 7/08; G09B 5/065
See application file for complete search history.

(56) References Cited

U.S. PATENT DOCUMENTS

| | | |
|---|---|---|
| 2011/0039244 A1 | 2/2011 | Packard |
| 2012/0208166 A1 | 8/2012 | Ernst |
| 2014/0057242 A1 | 2/2014 | Sherman |
| 2014/0335497 A1 | 11/2014 | Gal |
| 2015/0269854 A1* | 9/2015 | Maharaj ............... G09B 5/08 434/353 |
| 2016/0249989 A1 | 9/2016 | Devam |

(Continued)

OTHER PUBLICATIONS

"Method and System for Generating Customized Self-Study Plan via ARVRMR Environment for Learning Platforms Based on Wearables Tech", An IP.com Prior Art Database Technical Disclosure, Disclosed Anonymously, IP.com No. IPCOM000261326D, IP.com Electronic Publication Date: Feb. 22, 2020, 6 pages, <https://priorart.ip.com/IPCOM/000261326>.

(Continued)

*Primary Examiner* — Omkar A Deodhar
(74) *Attorney, Agent, or Firm* — Michael A. Petrocelli

(57) ABSTRACT

A learning model is created using a computer which includes receiving input from a user. The learning model includes comparing the input to the knowledge area in a knowledge database to assess a level of proficiency on topics within the knowledge area. The learning model includes determining topics of knowledge within the knowledge area where a user currently meets a proficiency threshold for one or more topics. A work topic is identified within the knowledge area where the user does not meet the proficiency threshold. Study material is presented to the user for the work topic of the knowledge area using an interactive mechanism. Feedback is received regarding the study material for the work topic from the interactive mechanism from the user. The learning model includes evaluating the feedback from the user to determine a score which indicates when the user meets a proficiency threshold for the work topic.

21 Claims, 9 Drawing Sheets

(56) References Cited

U.S. PATENT DOCUMENTS

| | | | | |
|---|---|---|---|---|
| 2016/0364115 A1* | 12/2016 | Joung | ................ | G06F 3/04842 |
| 2017/0221373 A1* | 8/2017 | Dasgupta | ................ | G09B 7/02 |
| 2019/0303655 A1 | 10/2019 | Werner | | |
| 2020/0051460 A1* | 2/2020 | Bedor | ................... | G09B 19/22 |
| 2021/0049923 A1* | 2/2021 | Brinton | ................... | G09B 7/00 |

OTHER PUBLICATIONS

Jain, et al., "Artificial Intelligence-Based Student Learning Evaluation: A Concept Map-Based Approach for Analyzing a Student's Understanding of a Topic", IEEE Transactions on Learning Technologies, vol. 7, No. 3, Jul.-Sep. 2014, pp. 267-279.

Kurilovas, Eugenijus, "Evaluation of quality and personalisation of VR/AR/MR learning systems", Behaviour & Information Technology, vol. 35, 2016, Issue 11: Virtual reality in learning, collaboration and behaviour: content, systems, strategies, context designs, Abstract Only, pp. 998-1007, <https://www.tandfonline.com/doi/full/10.1080/0144929X.2016.1212929>.

Mell, et al., "The NIST Definition of Cloud Computing", National Institute of Standards and Technology, Special Publication 800-145, Sep. 2011, 7 pages.

\* cited by examiner

COMPUTER ENABLED MODELING FOR FACILITATING A USER LEARNING TRAJECTORY TO A LEARNING GOAL

BACKGROUND

The present disclosure relates to a computer learning model, for addressing gaps in a learning trajectory for a user.

Various pedagogic concepts can be taught in a classroom setting and a virtual classroom. In one example, students who may not understand the concepts taught might want to learn the concepts for themselves in a way that works for them. E-learning methods used today may include various methods and techniques to explain concepts, and even one-to-one tutoring is an option.

One learning technique includes instruction from a teacher to the student, where the teacher can ask a student to paraphrase and explain a topic or concept and then validate through solving problems where applicable and/or a test to determine the understanding. However, such a learning trajectory for a student has the disadvantage that use of right phrases and keywords could mask the fact that the student may have challenges in expressing it in other circumstances.

In another example, other methods of teaching can include where a student plays out the learning, for example, playing music or a musical number to prove or test mastery of the material knowing and then doing it where an expert assesses the right learning.

For such methods and technique of learning a disadvantage can be that the student would not know if their learning trajectory to the end point of testing or evaluation is correct as it is only the end point where the measurement takes place, not in the trajectory. Historically, that could be a journey each student does on their own and in that journey, other aspects like discussing amongst other learners can also be used as tools.

However, there can remain a gap in learning when students are on the journey, finding the wrong paths being taken and correcting it early, or showing the student where they have made mistakes may not identified. In one example, a final test may not reflect a misunderstanding but a student may not use the right words even if they understood the concepts correctly, or a student may use the right words to describe their incorrect understanding and cannot determine what correction is needed.

There is need for a technique to assist a student in their learning trajectory to assess their understanding of material and subject matter, and help a student correctly describe their understanding of a concept. Also, even when a solution is found to an identified learning gap, some students may seek other peer students' feedback who may not have a background to help them properly on their trajectory.

Some continuous learning methods can use AR/VR (Augmented Reality/Virtual Reality) methods which use gamification and interactivity more to deliver information at each stage, where they use questions to determine if a student has understood material based on an answer provided by the student. However, this technique does not provide feedback during the trajectory of the learning process for the student.

SUMMARY

The present disclosure recognizes the shortcomings and problems associated with current techniques for learning assistance to achieve learning goals.

An embodiment according to the present invention can include identifying gaps in learning solutions along a learning journey by a student. The present invention includes embodiments which analyze a student's or user's descriptive understanding of a topic, and can determine from the expression of the student or user or feedback from the student the gaps or faults/misunderstandings in the direction of understanding of the student based on the type and path of the learning journey.

In an aspect according to the present invention, a computer-implemented method for generating a computer learning model for facilitating a learning trajectory for a learning goal of a user, including developing a learning model using a computer to facilitate a learning trajectory for a learning goal of a user. The learning model can include the following: receiving input from a user, the input including information regarding proficiency of learning in a knowledge area; and comparing the input to the knowledge area as in a knowledge database to assess a level of proficiency on topics within the knowledge area. The learning model can further include determining for the knowledge area identified by the user, topics of knowledge within the knowledge area where a user currently meets a proficiency threshold for one or more topics in the knowledge area. The learning model can further include identifying a work topic within the knowledge area, where the user does not meet the proficiency threshold; and presenting, to the user, study material for the work topic of the knowledge area using an interactive mechanism. The learning model can further include receiving feedback regarding the study material for the work topic from the interactive mechanism from the user; evaluating the feedback from the user to determine a score which indicates when the user meets a proficiency threshold for the work topic; and communicating the score to the user and thereby whether the proficiency threshold for the work topic is met or not met.

In a related aspect, the method further includes identifying a plurality of work topics within the knowledge area, where the user does not meet respective proficiency thresholds. The method further can include presenting, to the user, study materials for each of the work topics, respectively, using an interactive mechanism; receiving feedback regarding the study materials for each of the work topics from the interactive mechanism from the user; evaluating the feedback from the user to determine a score for each of the work topics, respectively, which indicates when the user meets a proficiency threshold for each of the work topics, respectively; and communicating the scores to the user and thereby whether the proficiency threshold for each of the work topics is met or not met, respectively.

In a related aspect, the method can further include receiving testing input from the user on all topics within the knowledge area; evaluating scores for the user on the received testing input on all topics within the knowledge area to determine when a user is proficient in the knowledge area when the user meets proficiency thresholds for all respective topics in the knowledge area; and communicating to the user the scores and when the user meets the proficiency thresholds.

In a related aspect, the method can further include repeating receiving feedback from the interactive mechanic from the user to repeat the evaluating of the feedback to determine when the user meets the proficiency threshold for the work topic.

In a related aspect, the evaluating of the feedback can include scoring a proficiency test taken by the user for a topic, where the proficiency test is received and scored by the computer, and the method further comprising: determining a score for the user; and determining based on the score and a proficiency threshold based on a score for the topic, when the user passes the proficiency test; and communicating passing or failing of the proficiency test to the user.

In a related aspect, topics can include information regarding a knowledge area, points regarding a knowledge area, facts within a knowledge area, and/or a knowledge node referring to information regarding a knowledge area.

In a related aspect, proficiency of a topic can be determined by testing, interactive testing, and/or user input of self-evaluated proficiency for the topic.

In a related aspect, the interactive mechanism can include: a touch display, a display responding to a pointer device, a mouse, text input, voice input, and/or video input.

In a related aspect, the method can further include introducing interactive study with another user as at least part of study material for the work topic.

In a related aspect, the method further includes receiving additional feedback from the user in response to the interactive study with the another user to determine a positive impact on the user regarding learning the topic.

In a related aspect, the method can further include, after the determining of the positive impact on the user regarding learning the topic; initiating receiving feedback from the interactive mechanism from the user for evaluating of the feedback from the user for determining when the user meets a proficiency threshold for the work topic.

In a related aspect, information regarding the topics can be stored in a database.

In a related aspect, the study material and historical records for the user can be stored in a database.

In a related aspect, the method further includes repeating, in response to the user initiating a request for additional study material for the work topic: the presenting of the study material; the receiving of the feedback; the evaluating of the feedback; and the communicating of the score.

In a related aspect, the method further includes iteratively repeating the developing of the learning model in response to: receiving additional input from the user regarding additional study material for the work topic, or regarding proficiency pertaining to another work topic.

In a related aspect, the method further includes updating a historical database for the user based on the request for the additional study material, and the meeting or not meeting the proficiency threshold for the work topic.

In another related aspect, the method further includes the database communicating with another database to gather subject matter for one or more topics in a knowledge area.

In another related aspect, the method further includes the database communicating with a remote database via a communications network to gather subject matter for one or more topics in a knowledge area.

In another aspect, a computer-implemented method generates a computer learning model stored on a database, for facilitating a learning trajectory for a learning goal of a user, and further includes: storing information regarding a plurality of topics of knowledge areas, respectively, on a database; assessing proficiency of a user in one or more topics of the plurality of topics for a knowledge area of the knowledge areas, the assessing of the proficiency includes comparing a test result or a user assessment to the information regarding the topic; determining one or more work topics within the knowledge area where the user does not meet a proficiency threshold; requesting more information regarding the one or more work topics from a second database; packaging study material for the one or more work topics for the user to learn; presenting the study material to the user; and assessing the user for proficiency on the one or more work topics.

In another aspect, a system using a computer for generating a computer learning model for facilitating a learning trajectory for a learning goal of a user includes: a computer system comprising; a computer processor, a computer-readable storage medium, and program instructions stored on the computer-readable storage medium being executable by the processor, to cause the computer system to perform the following functions to; develop a learning model using a computer to facilitate a learning trajectory for a learning goal of a user, the learning model includes modules to perform the following; receive input from a user, the input including information regarding proficiency of learning in a knowledge area; compare the input to the knowledge area as in a knowledge database to assess a level of proficiency on topics within the knowledge area; determine for the knowledge area identified by the user, topics of knowledge within the knowledge area where a user currently meets a proficiency threshold for one or more topics in the knowledge area; identify a work topic within the knowledge area, where the user does not meet the proficiency threshold; present, to the user, study material for the work topic of the knowledge area using an interactive mechanism; receive feedback regarding the study material for the work topic from the interactive mechanism from the user; evaluate the feedback from the user to determine a score which indicates when the user meets a proficiency threshold for the work topic; and communicate the score to the user and thereby whether the proficiency threshold for the work topic is met or not met.

In another aspect, a computer program product generates a computer learning model for facilitating a learning trajectory for a learning goal of a user. The computer program product comprises a computer readable storage medium having program instructions embodied therewith, and the program instructions are executable by a computer to cause the computer to perform functions, by the computer, comprising the functions to: develop a learning model using a computer to facilitate a learning trajectory for a learning goal of a user, the learning model includes modules to perform the following; receive input from a user, the input including information regarding proficiency of learning in a knowledge area; compare the input to the knowledge area as in a knowledge database to assess a level of proficiency on topics within the knowledge area; determine for the knowledge area identified by the user, topics of knowledge within the knowledge area where a user currently meets a proficiency threshold for one or more topics in the knowledge area; identify a work topic within the knowledge area, where the user does not meet the proficiency threshold; present, to the user, study material for the work topic of the knowledge area using an interactive mechanism; receive feedback regarding the study material for the work topic from the interactive mechanism from the user; evaluate the feedback from the user to determine a score which indicates when the user meets a proficiency threshold for the work topic; and communicate the score to the user and thereby whether the proficiency threshold for the work topic is met or not met.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Figure 1:
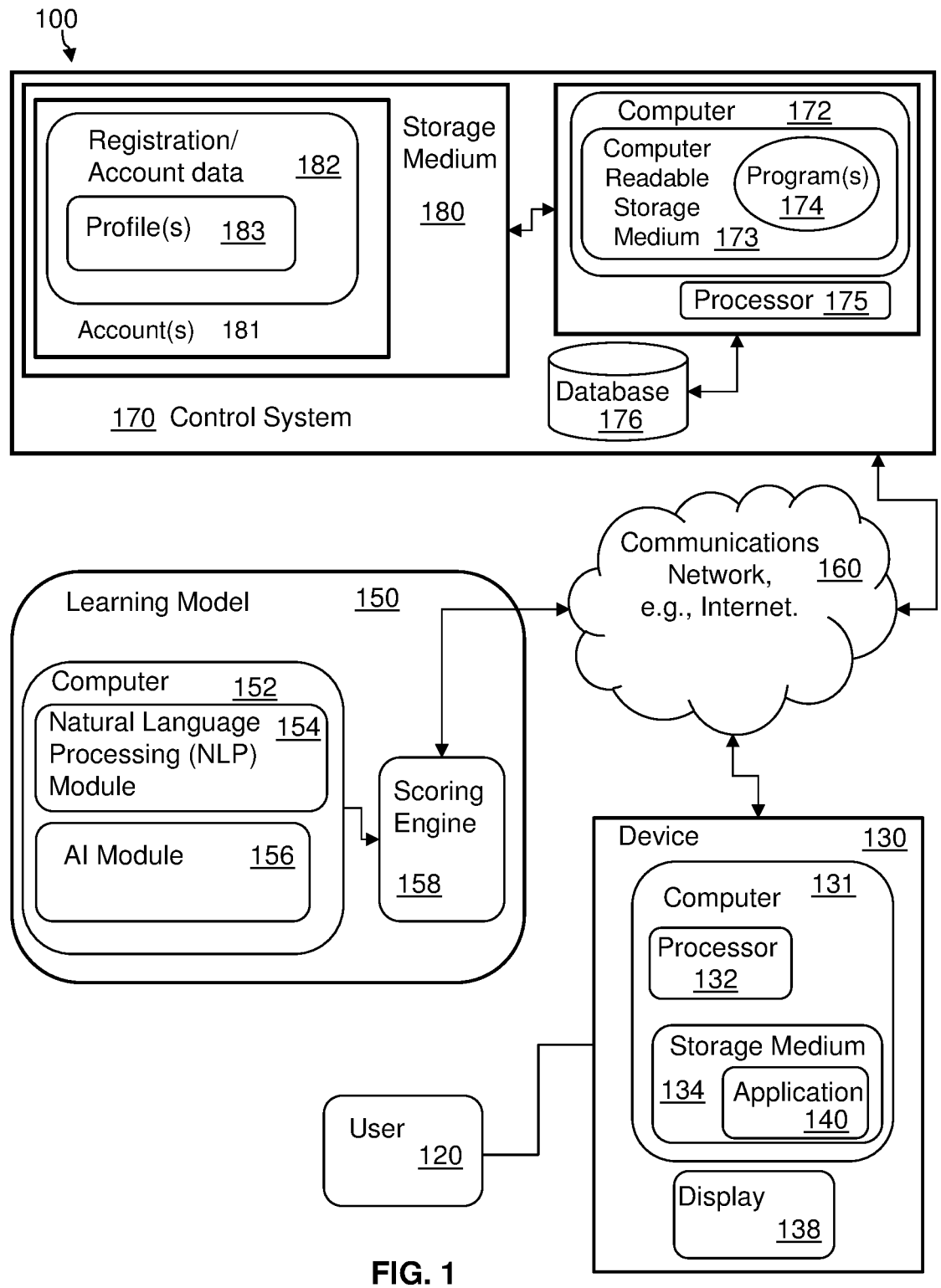
FIG. 1 is a schematic block diagram illustrating an overview of a system, system features or components, and methodology for generating a computer learning model for facilitating a learning trajectory for learning goals of a user, according to an embodiment of the present disclosure.
Figure 2:
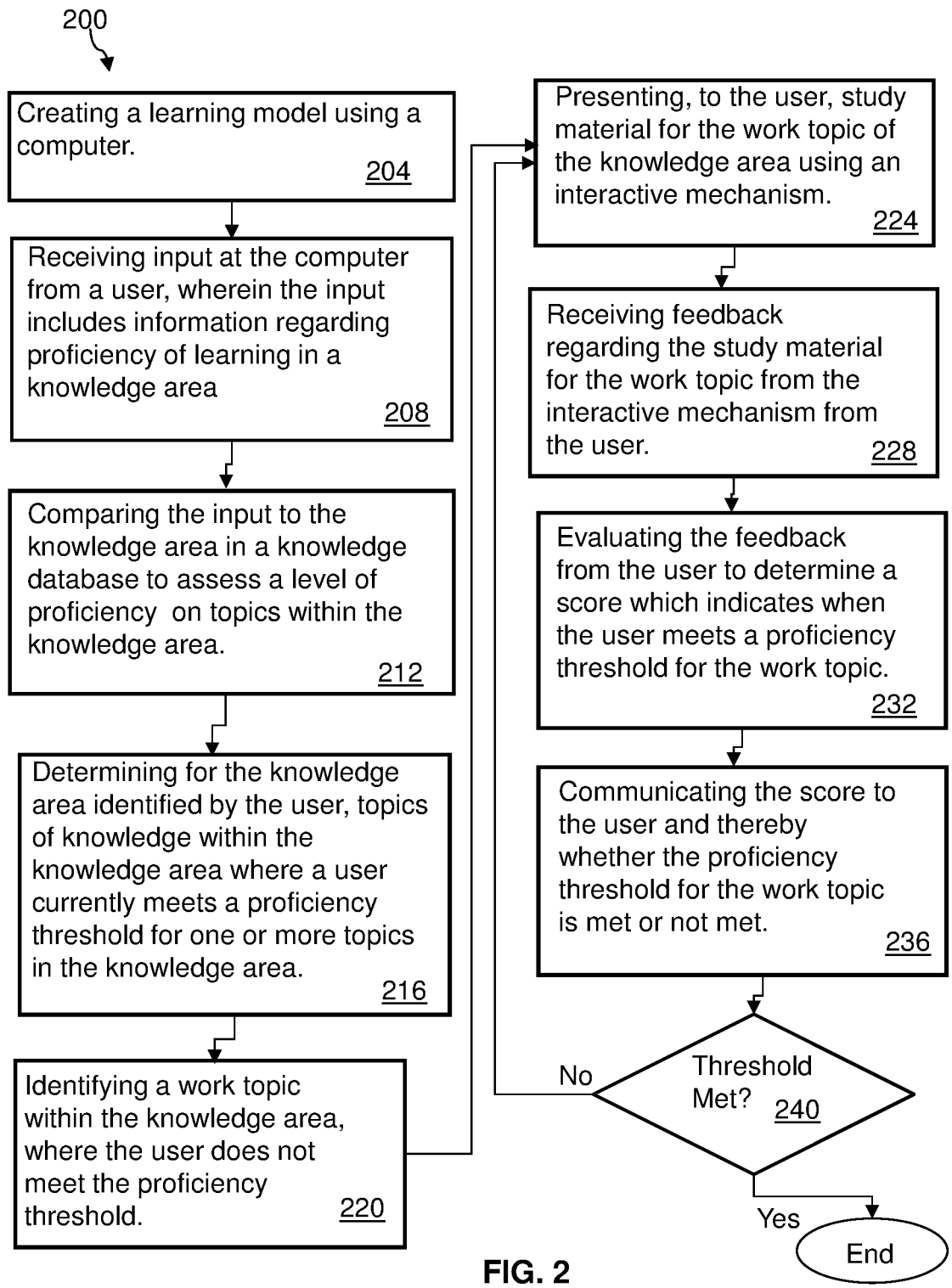
FIG. 2 is a flow chart illustrating a method, implemented using the system shown in FIG. 1, for generating a computer learning model for facilitating a learning trajectory for learning goals of a user, according to an embodiment of the present disclosure.
Figure 3:
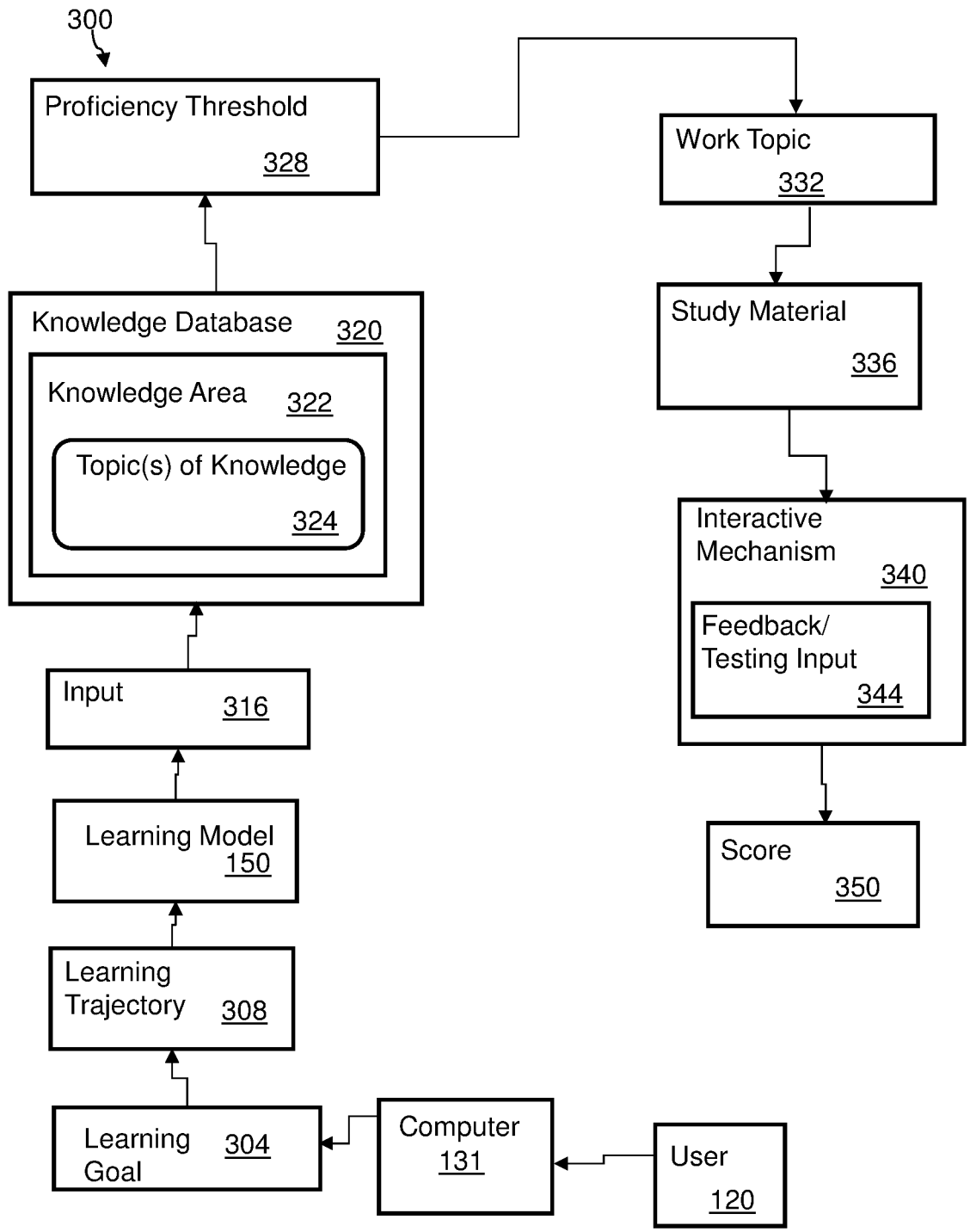
FIG. 3 is a functional schematic block diagram showing a series of operations and functional methodologies, for instructional purposes illustrating functional features of the present disclosure associated with the embodiments shown in the FIGS., for generating a computer learning model for facilitating a learning trajectory for learning goals of a user.

Referring to FIGS. 1, 2 and 3, a computer-implemented method 200 for generating a computer learning model 150 for facilitating a learning trajectory for learning goals 304 of a user, according to an embodiment of the present disclosure. The method 200 includes a-series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The method 200 includes developing (which can include creating, and/or generating) a learning model 150 using a computer 152, as in block 204, which can include, as all or in part, an Artificial Intelligence component or module 156. Developing the learning model includes the following operations.

Receiving input 316 at the computer 152 from a user 120, wherein the input includes information regarding proficiency of learning in a knowledge area, as in block 208. The input can include text, or voice translated to text using a NLP (Natural Language Processing) module 154. The input can include a completed assessment from the user regarding the user's proficiency on a topic or in a knowledge area. In another example, the input can include test results or a completed test for assessing proficiency on a topic or in a knowledge area.

The user 120 can use a device 130 having a computer 131 which includes a processor 132, and a storage medium 134 which includes an application 140. The device 130 can include a display 138. The device 130 can communicate with the learning model 150 via the communications network 160. Further, the device can communicate via the communications network 160 to a control system 170 which can store a user profile 183 as part of a registration account or data 182 in an account 181 stored on a storage medium 180.

The method includes comparing the input 316 to the knowledge area as in a knowledge database to assess a level of proficiency on topics within the knowledge area, as in block 212. For example, information (e.g., data) regarding a topic or regarding many topics 324 of a knowledge area 322 can be stored in the knowledge database 320. User test data including answers to questions can be verified by comparing the test data to topic data of a knowledge area in the knowledge database.

The method 200 includes determining for the knowledge area identified by the user, topics of knowledge within the knowledge area where a user currently meets a proficiency threshold 328 for one or more topics in the knowledge area, as in block 216. A topic can also be referred to as a point or a node. Proficiency can also be referred to as a knowledge level. For example, when a user's test answers result in a test score that is lower than a proficiency threshold, a conclusion can be made that proficiency of a topic is not met. And, likewise, the opposite is true when a user's test answers result in a test score that is higher than a proficiency threshold, a conclusion is made that proficiency of a topic is met.

The method includes identifying a work topic 332 within the knowledge area, where the user does not meet the proficiency threshold, as in block 220. For example, as discussed above, a user cannot meet a proficiency threshold. The method and system can present a topic where a proficiency threshold is not met as a work topic, that is, determining that the topic needs work or is new to the user based on the user's proficiency score. Thus, a work topic can be new to the user as in the user has not seen the subject matter before, or new or needs work as in the user does not meet a proficiency score on the new topic. A work topic can also be referred to as another topic, or as a topic where the user does not meet proficiency, or as a suggested topic, or a topic for mastering, or a new topic. All of which synonymous as used herein and describe a topic for the user to learn and/or master, and/or meet proficiency.

The method includes presenting, to the user, study material 336 for the work topic of the knowledge area using an interactive mechanism 340, as in block 224. In one example, the presentation of study material can be implemented interactive mechanisms such as video and/or text, downloadable reading materials or other materials such as video, or interactive study techniques regarding the study material. An interactive mechanism can be any technique where a user can receive or view study materials. In another example, the study material itself can be compiled or created by experts on topics, or mined from one or more sources using data mining techniques, or a combination thereof.

The method includes receiving feedback 344 regarding the study material for the work topic from the interactive mechanism from the user, as in block 228. For example, a user can answer question online, or upload/share/email answers to questions or work materials/homework or testing materials.

The method includes evaluating the feedback 344 from the user to determine a score 350 which indicates when the user meets a proficiency threshold for the work topic, as in block 232. For example, the feedback can be evaluated by scoring test answers or having an expert/teacher grade submitted materials, or in one example by using an AI interactive mechanism such as a chatbot. Such scoring can be accomplished using a scoring engine 158.

The method includes communicating the score to the user and thereby whether the proficiency threshold for the work topic is met or not met, as in block 236. For example, such communication can include the same communication mechanism used for interactive communication between the user or student user and the system or teacher. For example, a shared hard drive/shared data storage, audio/video conferencing, etc. Such communications can be accomplished using a communications network 160, for example, the Internet.

When the threshold is not met, at block 240, the method can return to block 224. When the threshold is met, at block 240, the method can end.

Other Embodiments and Examples

Figure 4:
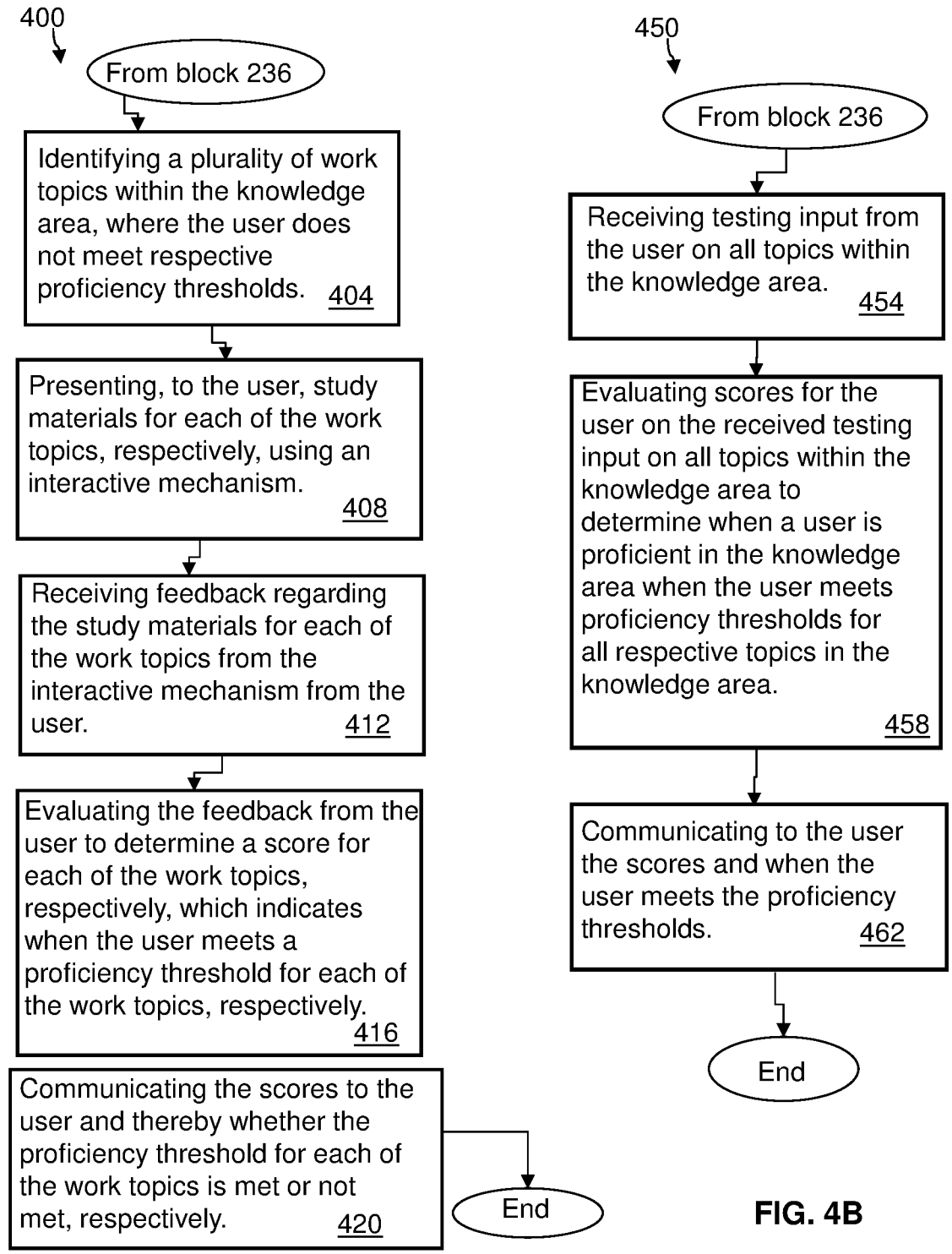
FIG. 4A is a flow chart illustrating another method, which continues from the flow chart of FIG. 2, for generating a computer learning model for facilitating a learning trajectory for learning goals of a user, according to an embodiment of the present disclosure.
FIG. 4B is a flow chart illustrating another method, which continues from the flow chart of FIG. 2, for generating a computer learning model for facilitating a learning trajectory for learning goals of a user, according to an embodiment of the present disclosure.

Referring to FIG. 4A, in another embodiment according to the present disclosure, a method 400 continuing from the method 200 at block 236, the method 450 includes identifying a plurality of work topics within the knowledge area, where the user does not meet respective proficiency thresholds, as in block 404.

The method 400 includes presenting, to the user, study materials for each of the work topics, respectively, using an interactive mechanism, as in block 408. The method 400 includes receiving feedback regarding the study materials for each of the work topics from the interactive mechanism from the user, as in block 412.

The method 400 includes evaluating the feedback from the user to determine a score for each of the work topics, respectively, which indicates when the user meets a proficiency threshold for each of the work topics, respectively, as in block 416.

The method 400 includes communicating the scores to the user and thereby whether the proficiency threshold for each of the work topics is met or not met, respectively, as in block 420.

Referring to FIG. 4B, in another embodiment according to the present disclosure, a method 450 includes continuing from the method 200 at block 236, which includes receiving testing input or feedback 344 from the user on all topics within the knowledge area, as in block 454.

The method 450 includes evaluating scores for the user on the received testing input on all topics within the knowledge area to determine when a user is proficient in the knowledge area when the user meets proficiency thresholds for all respective topics in the knowledge area, as in block 458.

The method 450 includes communicating to the user the scores and when the user meets the proficiency thresholds, as in block 462.

Additional Examples and Embodiments

In one example, the method(s) and system(s) according to the present disclosure can further include repeating receiving feedback from the interactive mechanic from the user to repeat the evaluating of the feedback to determine when the user meets the proficiency threshold for the work topic.

In one example, the evaluating of the feedback includes scoring a proficiency test taken by the user for a topic, where the proficiency test is received and scored by the computer, and the method can further include determining a score for the user. Determining based on the score and a proficiency threshold based on a score for the topic, when the user passes the proficiency test, and communicating passing or failing of the proficiency test to the user.

In one example, topics can include information regarding a knowledge area, points regarding a knowledge area, facts within a knowledge area, and/or a knowledge node referring to information regarding a knowledge area.

In another example, proficiency of a topic can be determined by testing, interactive testing, and/or user input of self-evaluated proficiency for the topic.

In another example, the interactive mechanism can include: a touch display, a display responding to a pointer device, a mouse, text input, voice input, and/or video input.

In another example, a method or system can include introducing interactive study with another user as at least part of study material for a work topic.

In another example, a method or system can include receiving additional feedback from the user in response to the interactive study with the another user to determine a positive impact on the user regarding learning the topic.

In another example, a method or system can include, after the determining of the positive impact on the user regarding learning the topic, initiating receiving feedback from the interactive mechanism from the user for evaluating of the feedback from the user for determining when the user meets a proficiency threshold for the work topic.

In another example, information regarding the topics can be stored in a database.

In another example, the study material and historical records for the user can be stored in a database.

In another example, a method and system can include repeating, in response to the user initiating a request for additional study material for the work topic: the presenting of the study material; the receiving of the feedback; the evaluating of the feedback; and the communicating of the score. For example, a user may request for more study materials based on their own initiative to study more about a topic. In another example, a user may request more study materials in response to not meeting a proficiency threshold regarding a topic. In response to the user request, the method and system can repeat operations of presenting, to the user, study material for the work topic of the knowledge area using an interactive mechanism; and receiving feedback regarding the study material for the work topic from the interactive mechanism from the user; and evaluating the feedback from the user to determine a score which indicates when the user meets a proficiency threshold for the work topic; and communicating the score to the user and thereby whether the proficiency threshold for the work topic is met or not met.

Thereby, the learning model is developed, and can provide study material in response to the user request. The user can acknowledge receipt of the materials. The user provide feedback in response to the materials in the form of a test of proficiency for the work topic. The method and system can receive the feedback, that is the test in this example. And in response to the receiving the test, the method and system can provide test results or a score to the user which includes or is in addition to a result of meeting or not meeting proficiency for the work topic.

In another example, a method and system can include iteratively repeating the developing of the learning model in response to: receiving additional input from the user regarding additional study material for the work topic, or regarding proficiency pertaining to another work topic. For example, a user may request for more study materials based on their own initiative to study more about a topic. In another example, a user may request more study materials in response to not meeting a proficiency threshold regarding a topic. In another example, a user may request study material to inquire about a work topic. In response to the user request, the method and system can repeat operations recited in the previous described methods and system for developing a learning model. For example, the method 200 with reference to FIG. 2.

Thereby, the learning model is developed, and can provide study material in response to the user request. The user can acknowledge receipt of the materials. The user can provide feedback in response to the materials in the form of a test of proficiency for the work topic. The method and system can receive the feedback, that is, the test in this example. And in response to the receiving the test, the method and system can provide test results or a score to the user which includes or is in addition to a result of meeting or not meeting proficiency for the work topic. These operations can be repeated to develop the learning model and to assist the user in learning.

In another example, a method and system can include updating a historical database for the user based on the request for the additional learning material, and the meeting or not meeting the proficiency threshold for the work topic.

In another example, a method and system can include the database communicating with another database to gather subject matter for one or more topics in a knowledge area.

In another example, a database can communicate with a remote database via a communications network to gather subject matter for one or more topics in a knowledge area.

More Embodiments and Examples

Figure 5:
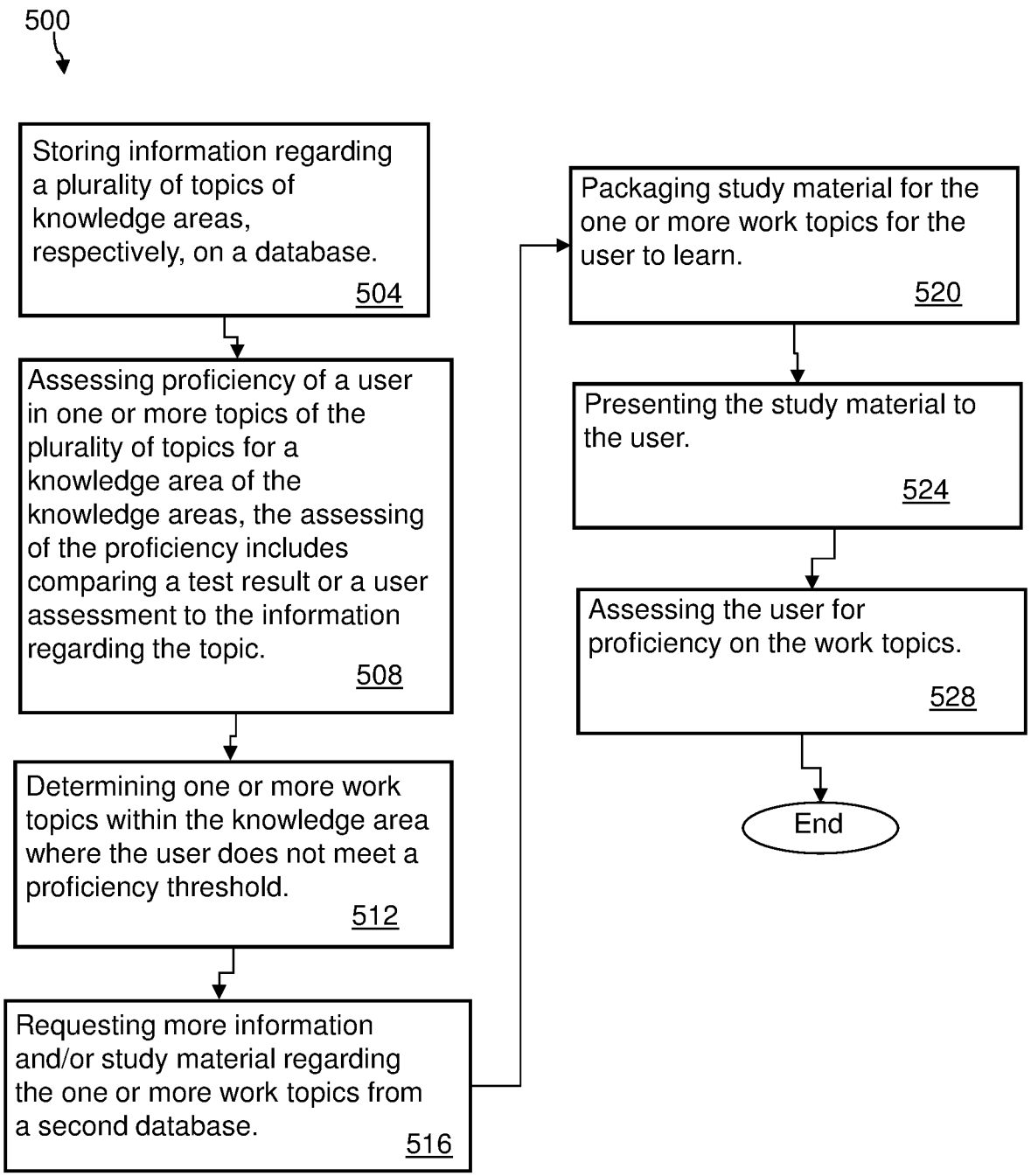
FIG. 5 is a flow chart illustrating another method, which can be implemented, at least in part, using the system shown in FIG. 1, for generating a computer learning model using multiple databases for facilitating a learning trajectory for learning goals of a user, according to an embodiment of the present disclosure.

Referring to FIG. 5, in another embodiment according to the present disclosure, a computer-implemented method 500 for generating a computer learning model for facilitating a learning trajectory 308 for learning goals 304 of a user includes storing information regarding a plurality of topics of knowledge areas, respectively, on a database, as in block 504.

The method 500 includes assessing proficiency of a user in one or more topics of the plurality of topics for a knowledge area of the knowledge areas, the assessing of the proficiency includes comparing a test result or a user assessment to the information regarding the topic, as in block 508.

The method 500 includes determining one or more work topics within the knowledge area where the user does not meet a proficiency threshold, as in block 512.

The method 500 includes requesting more information and/or study material regarding the one or more work topics from a second database, as in block 516.

The method 500 includes packaging study material for the one or more work topics for the user to learn, as in block 520. For example, packaging study material can include, in response to the user not meeting a proficiency threshold for a work topic and/or a user requesting additional study material for the work topic, the method 500 and system selecting study material based on helping the user to master the work topic referred to above. As discussed above, the compiling of study material for a work topic can include requesting information from a database of material. Such compiling can also include, searching a database of materials or a knowledge database for information regarding a topic or knowledge area, and then gathering the information into a set of study materials for the topic.

The method 500 includes presenting the study material to the user, as in block 524.

The method 500 includes assessing the user for proficiency on the work topics, as in block 528.

Other Embodiments and Examples

Referring to FIG. 1, the user device 130 includes a computer 131 having a processor 132 and a storage medium 134 where an application 140, can be stored. The application can embody the features of the method of the present disclosure as instructions. The user can connect to a learning engine 150 using the device 130. The device 130 which includes the computer 131 and a display or monitor 138. The application 140 can embody the method of the present disclosure and can be stored on the computer readable storage medium 134. The device 130 can further include the processor 132 for executing the application/software 140. The device 130 can communicate with a communications network 160, e.g., the Internet.

It is understood that the user device 130 is representative of similar devices which can be for other user, as representative of such devices, which can include, mobile devices, smart devices, laptop computers etc.

In another example and embodiment, profiles can be saved for users/participants in the control system. Such profiles can supply data regarding the user and history of deliveries for analysis. When a profile does not already exist for a user, a profile can be created.

In one example, the system of the present disclosure can include a control system 170 communicating with the user device 130 via a communications network 160. The control system can incorporate all or part of an application or software for implementing the method of the present disclosure. The control system can include a computer readable storage medium 180 where account data and/or registration data 182 can be stored. User profiles 183 can be part of the account data and stored on the storage medium 180. The control system can include a computer 172 having computer readable storage medium 173 and software programs 174 stored therein. A processor 175 can be used to execute or implement the instructions of the software program. The control system can also include a database 176.

In one example, a user can register or create an account using the control system 170 which can include one or more profiles 183 as part of registration and/or account data 182. The registration can include profiles for each user having personalized data. For example, users can register using a website via their computer and GUI (Graphical User Interface) interface. The registration or account data 182 can include profiles 183 for an account 181 for each user. Such accounts can be stored on the control system 170, which can also use the database 176 for data storage.

Additionally, the method and system is discussed with reference to FIG. 3, which is a functional system 300 which includes components and operations for embodiments according to the present disclosure, and is used herein for reference when describing the methods and systems of the present disclosure. Additionally, the functional system 300, according to an embodiment of the present disclosure, depicts functional operation indicative of the embodiments discussed herein.

More Embodiments and Examples

The present disclosure enables a new model of learning support based on a student's learning trajectory 308. The final goal in learning is to build knowledge on a topic or area. In the present disclosure, the measurement of the correctness of the learning is by verifying the textual expression of the learning by the student. A student's wrong understanding or mis-understanding of the knowledge in their learning trajectory, confirmed by a textual expression not being correct, is sought to be reduced by using multi-modal expression capture in the trajectory of their learning.

For example, using AR-VR modes, a student's learning trajectory can be determined from the initial session of learning and transformation of the multi-modal temporal expression of the learning by the student, gaps in learning can be identified. Then, based on this trajectory, appropriate information to build the knowledge acquired in the learning sessions can be provided. The student describes their learning to date using actions, movements and pressure, writing on virtual boards that is all captured and converted to temporo-textual form at each step and gaps if any determined. This cycle is repeated until a final level of knowledge correctly expressed by the student is reached. If a student gets stuck with multiple iterations, avatars of peer students can be introduced or combined student pairing for learning between the AR-VR systems showing the trajectory taken by the first learner or the trajectories of both the students to enable them to co-learn.

One advantage of embodiments of the present disclosure is that students can describe their learning in an AR/VR environment where their input is converted to equivalent sentences for analysis. Such descriptions can be analyzed to determine the gaps in learning or the mis-direction of the paths of learning. Appropriate equivalences to adjust the direction of learning to reach the final knowledge level from the information is computed by a method and system of the present disclosure.

Based on a re-direction computation, appropriate equivalences are now provided in the AR/VR environment and the student can be guided in their chosen path which is still directed to the final goal of the learning.

If students get stuck in a learning point on the trajectory, co-learning with actual students or their avatars can be used.

The present disclosure can include a solution, which can refer to a method and system according to the present disclosure, which includes AR/VR recording of multi-sensory inputs from the student and creating an equivalent referential textual description aligned to the topic/concept with the ability for the student to review and correct if necessary. Analysis of the referential description from the student and determining the learning journey trajectory used by the student can include comparing at the text level, the referential textual description to the topic/concept, and determining where a gap in learning is found. Such a determination can include using verbal input or input from actions using the AR-VR system.

The solution can include determining learning gaps, identify the learning material to address the gaps, and creating a learning capsules for an AR-VR mode of instruction. The learning can be reinforced by enabling the student to repeatedly practice and recite at each node/point in the trajectory. The learning can be reinforced by bringing out the right textual expression temporally in written or spoken form following the grammar strictly that shows minimal or no gaps to the referential knowledge base. The trajectories can be mixed when a student is stuck and takes help from other students to un-entangle the learning knot they may have gotten themselves into.

In another example according to the present disclosure, a solution helps to identify a gap in learning and understanding of a concept by a student during the various stages of learning (for example, concept introduction, novice, learning stage, intermediate, competent, advanced) using AR-VR techniques. The solution can also measure the level at which the student has grasped a concept based on its interaction at various levels in various forms. Students can use this solution in their learning journey.

The solution evaluates the level of understanding at various stages of the learning journey. For example, during a novice stage, the proposed solution can interact with the student by explaining a concept and providing various important aspects related to the concept. The solution may also try and evaluate the student's progress by asking multi choice questions to make sure the student is familiar with important aspects of the concept.

At any point of the learning journey, the solution can ask the student to provide their understanding in the form of a written/verbal description or through physical motion of the limbs related to the topic to evaluate the level of understanding on the concept. The solution can create a textual expression combining various words, for example, words for the actions assembled to fit grammar rules to create a grammatically correct textual expression. The extent of non-written or verbal descriptions will also be shown in the learning trajectory as a goal is to be able to clearly articulate in a textual form an expression of the topic/concept/idea that is being taught.

Once the solution creates a textual description of the written text, spoken words or actions that are captured in a temporal sequence, for the next point of a student's trajectory, a gap between the knowledge shared and the student's knowledge at that point in the trajectory is determined.

One example for determining the gap is based on an available description from the student. The solution can create a tensor that captures the text description with a triad of subject-verb-object plus its variants and all the triads in the description are kept in groups based on the paragraphs that the student has provided the text in. This can be considered a first level. The first level is then layered into further levels looking at the synonyms for the triad & its variants, the other subjects and objects from the meaning of the words in the triad at the second and third layers.

A comparison is made at the first and second levels between the reference topic's words at the different layers to those obtained from the student's submissions. If matches are found, the word density of positive comparisons to the overall reference words are made. Then at the third level, the thematic comparisons are made to determine the themes and relationships.

The solution would then identify the gap in understanding and create an AR/VR for the same and project the difference in the student's understanding in a way that would enable the student to identify the gap and also understand the correct concept.

In one example, a system according to the present disclosure can include a student can currently be in the process of learning a topic, for example, about velocity, and is in the intermediate stage of learning having undergone a concept multiple times. The system can then ask the student to explain the topic.

Continuing with the above example, the topic of velocity can be defined as the rate of change of the object's position with respect to a frame of reference and time. It is a vector quantity, which means it needs both magnitude and direction to be defined properly. Thus, velocity is a physical vector quantity, and both magnitude and direction are needed to define it.

In one example, velocity can be defined for data consumption as: Velocity . . . {rate of change of the object's position}, {change of the object's position with respect to a frame of reference and time}, {Velocity is a physical vector quantity}, {both magnitude and direction are needed to define it}.

Synonyms for velocity can be defined as: Velocity—pace, rate, momentum; Rate—amount, estimate, quota; Change—Difference, modification, adjustment; Position—location, point, situation; Vector—Aim, direction, course; Quantity—capacity, portion.

Meaning Areas can be defined as: rate of change of an object's position, displacement, change in direction of object.

Concepts/topics/themes ideas can be defined as: rate of change of objects position, change in direction, change in magnitude, vector.

In one example, the system can receive a student response after learning the topic which can include the text: Velocity is amount of distance covered by an object in unit time. It provides measure of how quickly an object is moving.

The system can analyze the student input as a student's velocity noun, object & verb variations: {amount of distance covered}, {distance covered by an object in unit time}, {measure of how quickly object is moving}.

The system can determine synonyms as: inertia; property; objects; state; force; resistance, including friction, impediment, hindrance.

The system can define Meaning areas as: amount of distance covered, speed, measure, concepts/topics/themes ideas: distance covered by an object, distance covered in unit time, speed.

The system can output results as: Velocity, rate of change of object's position, amount of distance covered, change of object's position with respect to time; as a first level match; and a rate of change of an object as a third level match in concepts.

The system can determine learning gaps by the student and generate a suggested direction to close the gap. The system determines that the definition of velocity of a change in magnitude and direction, and the student's input for a concept of velocity is a mismatch at the triad and meaning, and thus would need to be clarified for the student, as the student has provided definition of speed and not velocity. The system provides the definition that the difference between speed and velocity is that speed gives us an idea of how fast an object is moving whereas velocity not only tells us its speed but also tells us the direction the body is moving in. The student is correct in reciting part of the definition that velocity is a rate of change of an object with respect to time, but the student has missed the aspect of the change of the object with respect to position, i.e., direction. Student is also mixing the concepts of Speed and Velocity.

The system can determine that based on a profile of the student, the student seems to understand the concept easily if the representation is made visually. Hence in order to have the highest probability of a positive result to educate the student, the computation of understanding to mis-understanding is determined and the totality across layers is determined which provides the path of learning for the topic and as well as mis-understanding which can help tutors determine the level of removal of misunderstanding. The system can construct the same in AR—VR to construct the student's current understanding, highlight the difference and reconstruct the learning gap AR-VR to explain the misunderstanding.

In one example, an AR/VR solution could train the student in the learning gap in three steps: In step 1: selection of the mode of learning such as with concepts and examples, real life examples and concepts, deep basis first and the explanations, etc., based on which the initial lesson is shown in multi-media mode using AR/VR models. The student can then explain the learning back in words, speech, actions, drawings, acronyms, etc. The system recognizes the temporal and spatial expression in different modes and stitches them together as to what the student has described of the learning. The system compares the learning expressed to the base and determines the direction of the learning journey trajectory (using graph theory). The system can identify the gaps using the trajectory based on the needed reference/taught knowledge to that described by the student. The system can highlight the learning gap using simulated AR/VR and allow the student to restate if necessary. The system can generate an explanation of the concept using AR/VR based on the journey direction from the learning trajectory adopted.

Further, the system articulates various aspects of the definition. In the first part the system explains the concept of distance and time. After that, the system explains the concept of speed and the association of distance and time (for example, it highlights that this is what the student had mentioned as his definition for velocity). In the final part, the system brings in the concept of direction in addition to distance and time and explains the correct definition of velocity highlighting the gap.

In step 2, the system can include: analysis of the student's concept by combination of the journey path and the description extracted from the student's explanation; and identifying the missing aspect.

Further, the system highlights the student's definition. The system provides measure of how quickly an object is moving (e.g., how fast an object is moving). The system can generate text or voice that says how fast an object is moving is not velocity but speed and gives an example of the same. The system can then highlight that the measure or speed of an object in a given direction is called velocity. The system highlights that the student has missed an important aspect of direction in their definition and highlights it. The system can move ahead and explain the concept of acceleration.

In step 3, the system highlights and simulates the gap and can explain by text or voice the overall concept adopting information and knowledge items identified to suit the learning journey path. If student is not able to move beyond that point (that is, the point of the gap) and wants to bring other co-learners, their trajectories are matched or if the peer student is helping out, they can view the trajectory of the first learning to help un-entangle the knots in their learning. The system can provide an example to further clarify the concept of velocity by taking various scenarios of the object movement in different directions.

In step 4, the system can repeat or cycle as necessary until a final goal is reached, such as, measured competency on the topic.

An embodiment according to the present disclosure can include a system and method for an immersive experience addressing gaps in a trajectory for learning goals 304. The system and method can include receiving AR/VR recordings of multi-sensory inputs from the student and creating an equivalent referential textual description aligned to the topic/concept with the ability for the student to review and correct if necessary. The method can include a step of performing analysis of the referential description from the student and determining the learning journey trajectory used by the student, that is, compares at the text level to other dimensions by bringing up or detecting where the gap is found, and written, verbal or actions reflect the same in the AR-VR system.

The method includes determining the gaps, identify the learning material to address the gaps, and creating learning capsules for the AR-VR mode of instruction. The system and method includes a step of reinforcing the learning by enabling the student to repeatedly practice and recite at each node/point in the trajectory. The method includes bringing out the right textual expression temporally in written or spoken form following the grammar strictly that shows minimal or no gaps to the referential knowledge base. The system and method includes mixing the trajectories when a student is stuck, for example, not making learning progress, and takes help from other students to un-entangle the learning knot they may have gotten into.

Embodiments of the present disclosure can include a system and method for an immersive experience addressing gaps in the trajectory to learning goals. Determining the gaps, identifying the learning material to address the gaps and providing AR-VR mode of instruction. Advantages of the embodiments of the present disclosure can include receiving AR/VR recording of multi-sensory inputs from the student and creating an equivalent referential textual description aligned to the topic/concept with the ability for the student to review and correct if necessary. Another advantage can include analyzing the referential description from the student and determining the learning journey trajectory used by the student, by comparing at the text level, to other dimensions by bringing up where the gap is found, that is, written, verbal or actions reflecting the same in the AR-VR system. Another advantage can include determining the gaps, identify the learning material to address the gaps and create the learning capsules for the AR-VR mode of instruction. And, reinforcing the learning by enabling the student to repeatedly practice and recite at each node/point in the trajectory. Another advantage can include bringing out or generating the right textual expression temporally in written or spoken form following the grammar strictly that shows minimal or no gaps to the referential knowledge base. And, mixing the trajectories when a student is stuck and takes help from other students to un-entangle the learning knot they may have gotten into.

Operational blocks of the method 500 shown in FIG. 5 may be similar to operational blocks shown in FIGS. 1, 2, 3 and 4A and 4B. The method shown in FIG. 5 is intended as another example embodiment which can include aspects/operations shown and discussed previously in the present disclosure.

Additional Examples And Embodiments

Figure 6:
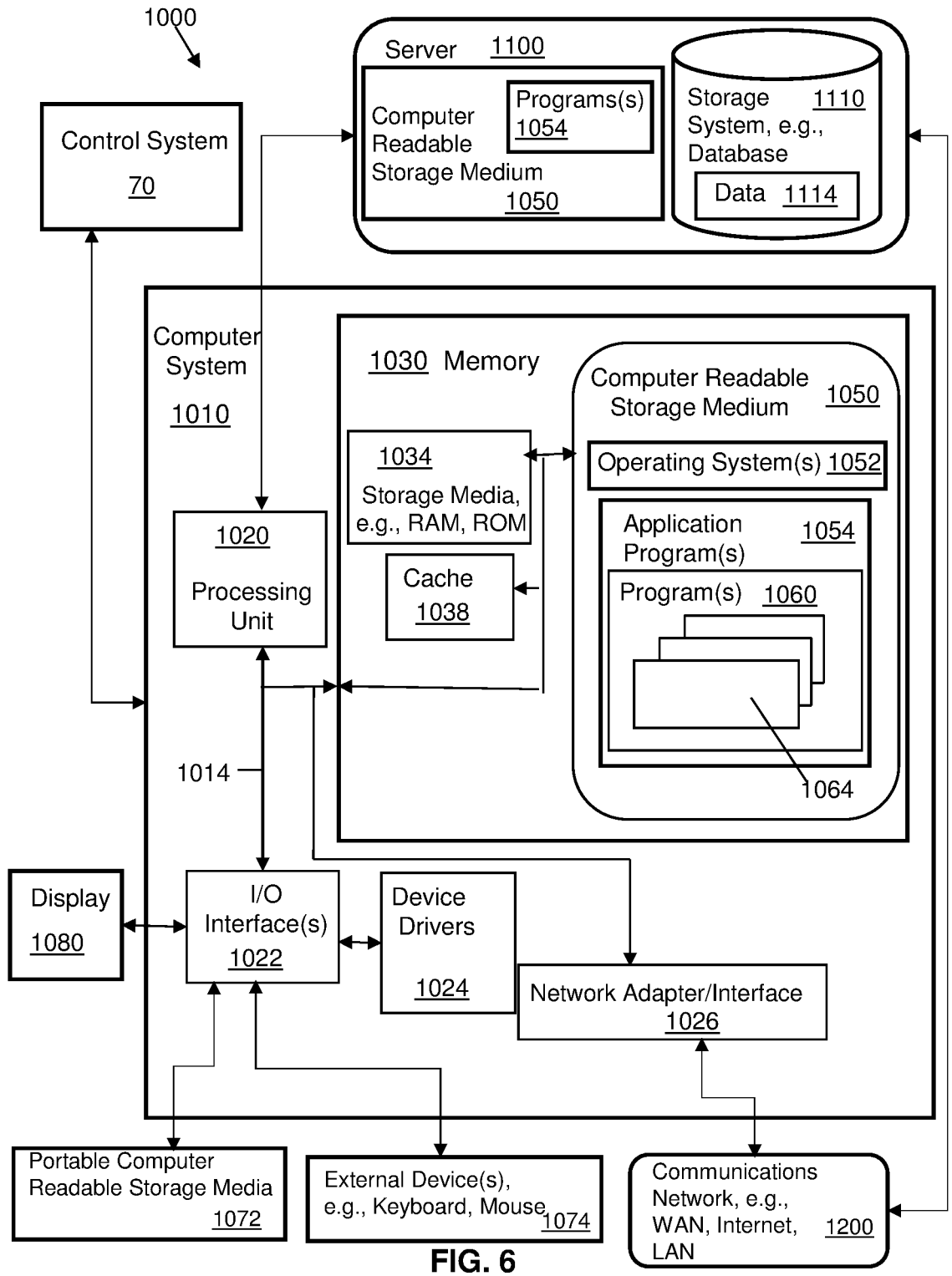
FIG. 6 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 6). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 140, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs 174, of the software application, stored on the computer 172 of the control system 170 communicates with the mobile device computer and executes other features of the method. The control system 170 and the device (e.g., mobile device or computer) 130 can communicate using a communications network 160, for example, the Internet.

Thereby, the method 100 according to an embodiment of the present disclosure, can be incorporated in one or more computer programs or an application 140 stored on an electronic storage medium 134, and executable by the processor 132, as part of the computer on mobile device. For example, a mobile device can communicate with the control system 170, and in another example, a device such as a video feed device can communicate directly with the control system 170. Other users (not shown) may have similar mobile devices which communicate with the control system similarly. The application can be stored, all or in part, on a computer or a computer in a mobile device and at a control system communicating with the mobile device, for example, using the communications network 160, such as the Internet. It is envisioned that the application can access all or part of program instructions to implement the method of the present disclosure. The program or application can communicate with a remote computer system via a communications network 160 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 6 and described in more detail in regards thereto referring to one or more computer systems 1010.

Thus, in one example, a control system 170 is in communication with the computer 130, and the computer can include the application or software 140. The computer 130, or a computer in a mobile device (not shown) communicates with the control system 170 using the communications network 160.

In another example, the control system 170 can have a front-end computer belonging to one or more users, and a back-end computer embodied as the control system.

Also, referring to FIG. 1, a device 130 can include a computer 131, computer readable storage medium 134, and operating systems, and/or programs, and/or a software application 140, which can include program instructions executable using a processor 132. These features are shown herein in FIG. 1, and also in an embodiment of a computer system shown in FIG. 6 referring to one or more computer systems 1010, which may include one or more generic computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system 170 via the communications network 160. In the embodiment of the control system shown in FIG. 1, the control system 170 includes a computer 172 communicating with a database 176 and one or more programs 174 stored on a computer readable storage medium 173. In the embodiment of the disclosure shown in FIG. 1, the device 130 communicates with the control system 170 and the one or more programs 174 stored on a computer readable storage medium 173. The control system includes the computer 172 having a processor 175, which also has access to the database 176.

The control system 170 can include a storage medium 180 for maintaining a registration 182 of users and their devices for analysis of the audio input. Such registration can include user profiles 183, which can include user data supplied by the users in reference to registering and setting-up an account. In an embodiment, the method and system which incorporates the present disclosure includes the control system (generally referred to as the back-end) in combination and cooperation with a front end of the method and system, which can be the application 140. In one example, the application 140 is stored on a device, for example, a computer or device on location 130, and can access data and additional programs at a back end of the application, e.g., control system 170.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device and computer 130 having the application 140. The application 140 is stored on the device or computer 130 and can access data and additional programs at the back end of the application, for example, in the program(s) 174 stored in the control system 170.

The program(s) 174 can include, all or in part, a series of executable steps for implementing the method of the present disclosure. A program, incorporating the present method, can be all or in part stored in the computer readable storage medium on the control system or, in all or in part, on a computer or device 130. It is envisioned that the control system 170 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 183, however, the method can include multiple profiles, users, registrations, etc. It is envisioned that a plurality of users or a group of users can register and provide profiles using the control system for use according to the method and system of the present disclosure.

Still Further Embodiments and Examples

It is understood that the features shown in some of the FIGURES, for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGURES may be similar to operational blocks shown in another figure. A method shown in one FIGURE may be another example embodiment which can include aspects/operations shown in another FIGURE and discussed previously.

Additional Embodiments and Examples

Account data, for instance, including profile data related to a user, and any data, personal or otherwise, can be collected and stored, for example, in the control system 170. It is understood that such data collection is done with the knowledge and consent of a user, and stored to preserve privacy, which is discussed in more detail below. Such data can include personal data, and data regarding personal items.

In one example a user can register 182 have an account 181 with a user profile 183 on a control system 170, which is discussed in more detail below. For example, data can be collected using techniques as discussed above, for example, using cameras, and data can be uploaded to a user profile by the user.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for a learning model for analyzing data associated with items and assets.

In another example, the control system 70 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Referring to FIG. 6, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 70, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embodiment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 7:
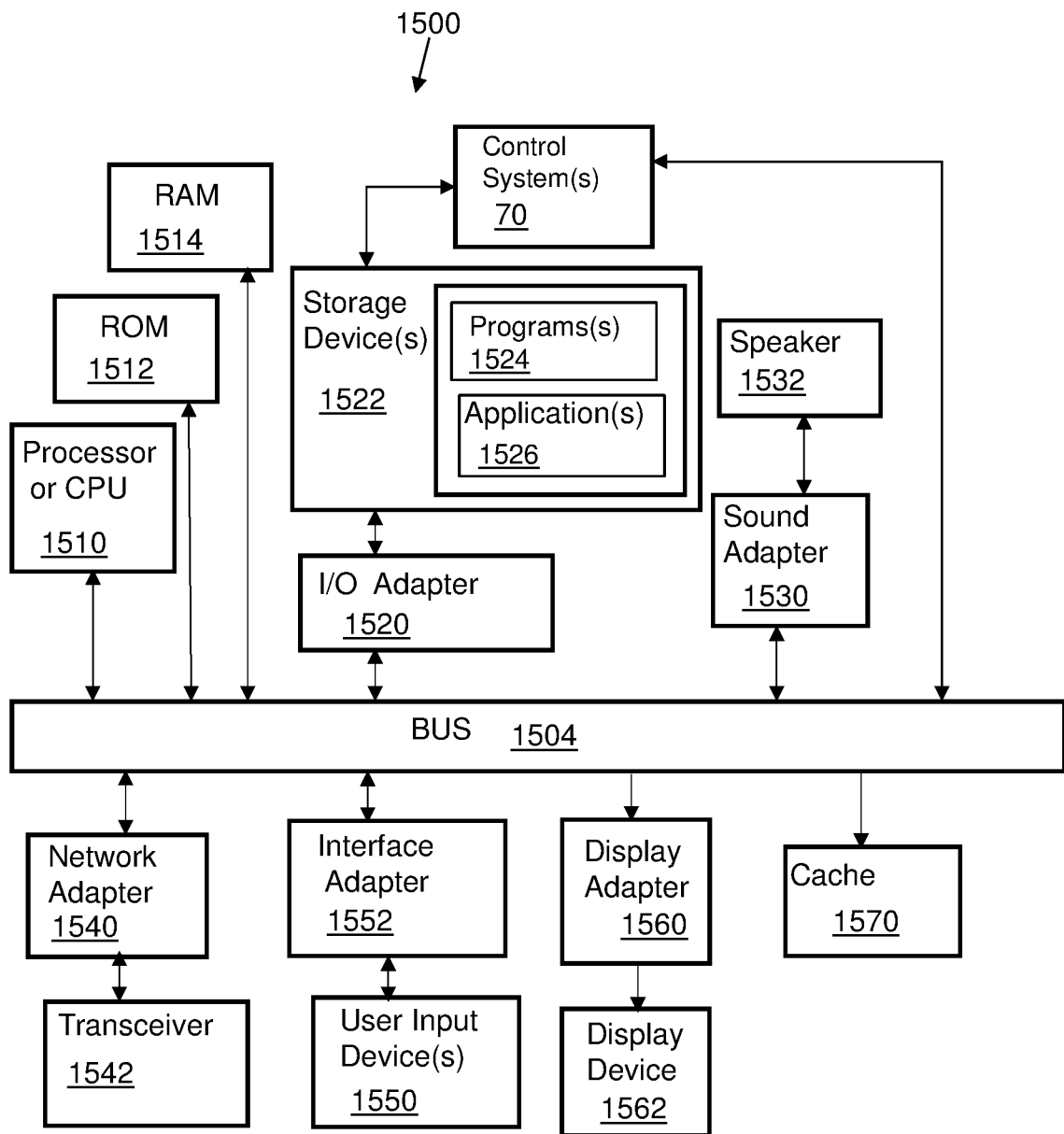
FIG. 7 is a schematic block diagram of a system depicting system components interconnected using a bus. The components for use, in all or in part, with the embodiments of the present disclosure, in accordance with one or more embodiments of the present disclosure.

Referring to FIG. 7, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 70 which communicates with the system bus, and thus can communicate with the other components of the system via the system bus. In one example, the storage device 1522, via the system bus, can communicate with the control system 70 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices.

The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
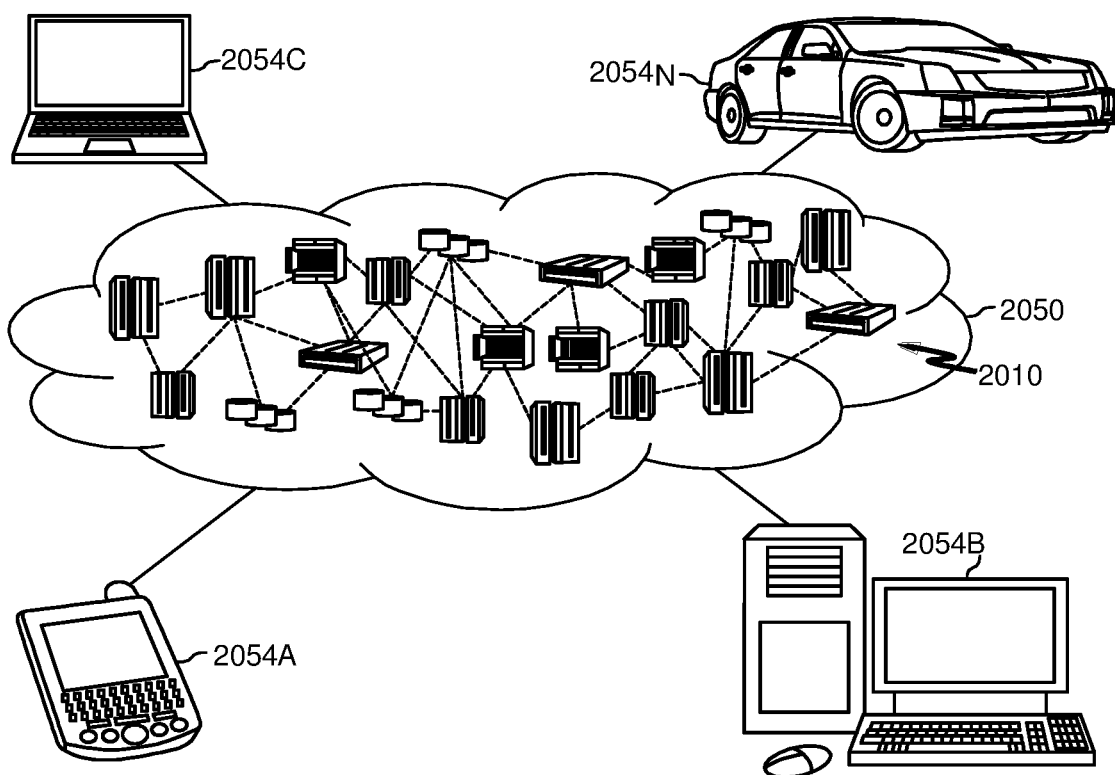
FIG. 8 is a block diagram depicting a cloud computing environment according to an embodiment of the present invention.

Referring now to FIG. 8, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 8 are intended to be illustrative only and that computing nodes 2010 and cloud computing environment 2050 can communicate with any type of computerized device over any type of network and/or network addressable connection (e.g., using a web browser).

Figure 9:
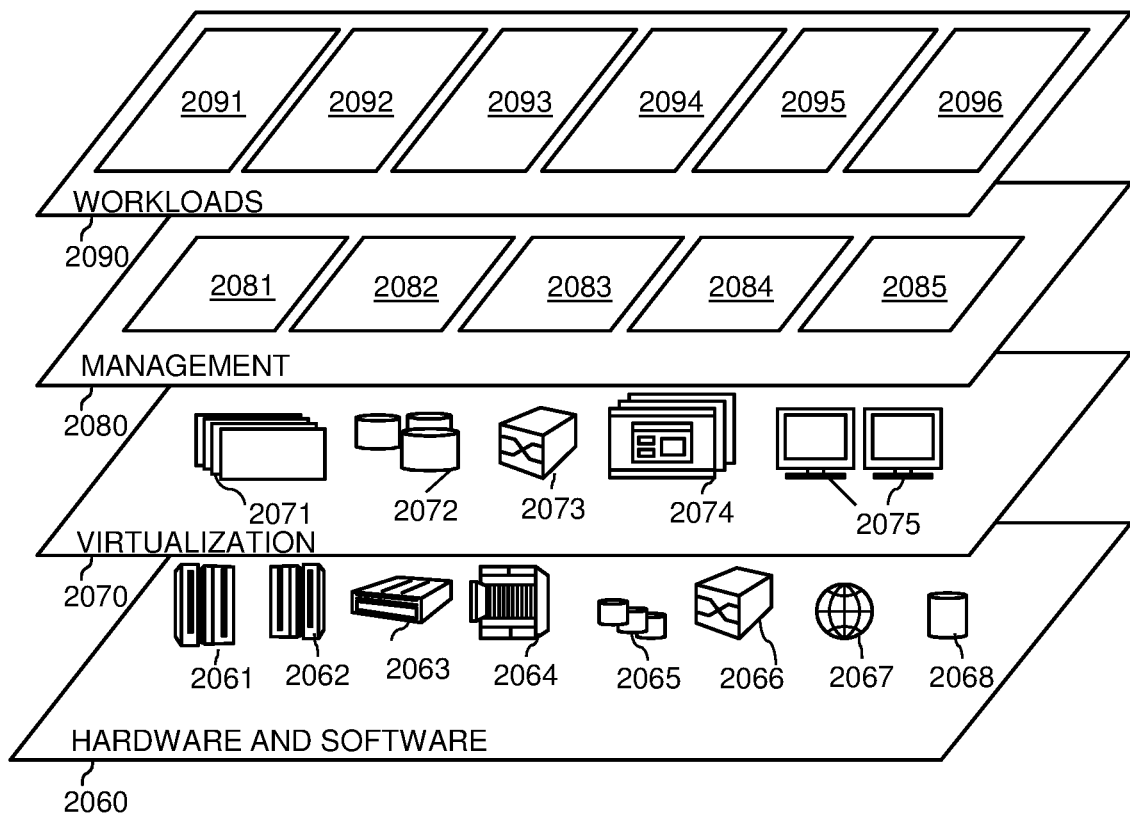
FIG. 9 is a block diagram depicting abstraction model layers according to an embodiment of the present invention.

Referring now to FIG. 9, a set of functional abstraction layers provided by cloud computing environment 2050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and generating a computer learning model 2096, for example, for facilitating a learning trajectory for learning goals of a user.

What is claimed is:

1. A computer-implemented method for generating a computer learning model for facilitating a learning trajectory for learning goals of a user, comprising:
   developing a learning model using a computer to facilitate a learning trajectory for a learning goal of a user, the learning model includes the following:
   receiving input from a user, the input including information regarding proficiency of learning in a knowledge area;
   comparing the input to the knowledge area as in a knowledge database to assess a level of proficiency on topics within the knowledge area;
   determining for the knowledge area identified by the user, topics of knowledge within the knowledge area where a user currently meets a proficiency threshold for one or more topics in the knowledge area;
   identifying a work topic within the knowledge area, where the user does not meet the proficiency threshold;
   presenting, to the user, study material for the work topic of the knowledge area using an interactive mechanism;
   the interactive mechanism including AR/VR (Augmented Reality/Virtual Reality) models communicating with the computer;
   receiving feedback regarding the study material for the work topic from the interactive mechanism from the user;
   evaluating the feedback from the user to determine a score which indicates when the user meets a proficiency threshold for the work topic;
   communicating the score to the user and thereby whether the proficiency threshold for the work topic is met or not met;
   analyzing the feedback and identifying a learning gap;
   highlighting and simulating the learning gap using the AR/VR models;
   identifying learning material to address the learning gap; and
   creating a learning capsule for an AR/VR mode of instruction using the AR/VR models.

2. The method of claim 1, further comprising:
   identifying a plurality of work topics within the knowledge area, where the user does not meet respective proficiency thresholds;
   presenting, to the user, study materials for each of the work topics, respectively, using an interactive mechanism;
   receiving feedback regarding the study materials for each of the work topics from the interactive mechanism from the user;
   evaluating the feedback from the user to determine a score for each of the work topics, respectively, which indicates when the user meets a proficiency threshold for each of the work topics, respectively; and
   communicating the scores to the user and thereby whether the proficiency threshold for each of the work topics is met or not met, respectively.

3. The method of claim 2, further comprising:
   receiving testing input from the user on all topics within the knowledge area;
   evaluating scores for the user on the received testing input on all topics within the knowledge area to determine when a user is proficient in the knowledge area when the user meets proficiency thresholds for all respective topics in the knowledge area; and
   communicating to the user the scores and when the user meets the proficiency thresholds.

4. The method of claim 1, further comprising:
   repeating receiving feedback from the interactive mechanic from the user to repeat the evaluating of the feedback to determine when the user meets the proficiency threshold for the work topic.

5. The method of claim 1, wherein the evaluating of the feedback includes scoring a proficiency test taken by the user for a topic, where the proficiency test is received and scored by the computer, and the method further comprising:
   determining a score for the user; and
   determining based on the score and a proficiency threshold based on a score for the topic, when the user passes the proficiency test; and
   communicating passing or failing of the proficiency test to the user.

6. The method of claim 1, wherein topics can include information regarding a knowledge area, points regarding a knowledge area, facts within a knowledge area, and/or a knowledge node referring to information regarding a knowledge area.

7. The method of claim 1, wherein proficiency of a topic is determined by testing, interactive testing, and/or user input of self-evaluated proficiency for the topic.

8. The method of claim 1, wherein the interactive mechanism can include: a touch display, a display responding to a pointer device, a mouse, text input, voice input, and/or video input.

9. The method of claim 1, further comprising:
   introducing interactive study with another user as at least part of study material for the work topic.

10. The method of claim 9, further comprising:
receiving additional feedback from the user in response to the interactive study with the another user to determine a positive impact on the user regarding learning the topic.

11. The method of claim 10, further comprising:
after the determining of the positive impact on the user regarding learning the topic; initiating receiving feedback from the interactive mechanism from the user for evaluating of the feedback from the user for determining when the user meets a proficiency threshold for the work topic.

12. The method of claim 1, wherein information regarding the topics is stored in a database.

13. The method of claim 1, wherein the study material and historical records for the user are stored in a database.

14. The method of claim 1, further comprising:
repeating, in response to the user initiating a request for additional study material for the work topic:
the presenting of the study material; the receiving of the feedback; the evaluating of the feedback; and the communicating of the score.

15. The method of claim 1, further comprising:
iteratively repeating the developing of the learning model in response to:
receiving additional input from the user regarding additional study material for the work topic, or regarding proficiency pertaining to another work topic.

16. The method of claim 15, further comprising:
updating a historical database for the user based on the request for the additional study material, and the meeting or not meeting the proficiency threshold for the work topic.

17. The method of claim 1, further comprising:
the database communicating with another database to gather subject matter for one or more topics in a knowledge area.

18. The method of claim 1, further comprising:
the database communicating with a remote database via a communications network to gather subject matter for one or more topics in a knowledge area.

19. A computer-implemented method generating a computer learning model stored on a database, for facilitating a learning trajectory for learning goals of a user, further comprising:
storing information regarding a plurality of topics of knowledge areas, respectively, on a database;
assessing proficiency of a user in one or more topics of the plurality of topics for a knowledge area of the knowledge areas, the assessing of the proficiency includes comparing a test result or a user assessment to the information regarding the topic;
determining one or more work topics within the knowledge area where the user does not meet a proficiency threshold;
requesting more information regarding the one or more work topics from a second database;
packaging study material for the one or more work topics for the user to learn;
presenting the study material to the user; and
assessing the user for proficiency on the one or more work topics.

20. A system using a computer for generating a computer learning model for facilitating a learning trajectory for learning goals of a user, which comprises:
a computer system comprising; a computer processor, a computer-readable storage medium, and program instructions stored on the computer-readable storage medium being executable by the processor, to cause the computer system to perform the following functions to;
develop a learning model using a computer to facilitate a learning trajectory for a learning goal of a user, the learning model includes modules to perform the following;
receive input from a user, the input including information regarding proficiency of learning in a knowledge area;
compare the input to the knowledge area as in a knowledge database to assess a level of proficiency on topics within the knowledge area;
determine for the knowledge area identified by the user, topics of knowledge within the knowledge area where a user currently meets a proficiency threshold for one or more topics in the knowledge area;
identify a work topic within the knowledge area, where the user does not meet the proficiency threshold;
present, to the user, study material for the work topic of the knowledge area using an interactive mechanism;
wherein the interactive mechanism includes AR/VR (Augmented Reality/Virtual Reality) models communicating with the computer;
receive feedback regarding the study material for the work topic from the interactive mechanism from the user;
evaluate the feedback from the user to determine a score which indicates when the user meets a proficiency threshold for the work topic;
communicate the score to the user and thereby whether the proficiency threshold for the work topic is met or not met;
analyze the feedback and identifying a learning gap;
highlight and simulating the learning gap using the AR/VR models;
identify learning material to address the learning gap; and
create a learning capsule for an AR/VR mode of instruction using the AR/VR models.

21. A computer program product for generating a computer learning model for facilitating a learning trajectory for learning goals of a user, the computer program product comprising a computer readable storage medium having program instructions embodied therewith, the program instructions executable by a computer to cause the computer to perform functions, by the computer, comprising the functions to:
develop a learning model using a computer to facilitate a learning trajectory for a learning goal of a user, the learning model includes modules to perform the following;
receive input from a user, the input including information regarding proficiency of learning in a knowledge area;
compare the input to the knowledge area as in a knowledge database to assess a level of proficiency on topics within the knowledge area;
determine for the knowledge area identified by the user, topics of knowledge within the knowledge area where a user currently meets a proficiency threshold for one or more topics in the knowledge area;
identify a work topic within the knowledge area, where the user does not meet the proficiency threshold;
present, to the user, study material for the work topic of the knowledge area using an interactive mechanism;
wherein the interactive mechanism includes AR/VR (Augmented Reality/Virtual Reality) models communicating with the computer;

receive feedback regarding the study material for the work topic from the interactive mechanism from the user;
evaluate the feedback from the user to determine a score which indicates when the user meets a proficiency threshold for the work topic;
communicate the score to the user and thereby whether the proficiency threshold for the work topic is met or not met;
analyze the feedback and identifying a learning gap;
highlight and simulating the learning gap using the AR/VR models;
identify learning material to address the learning gap; and
create a learning capsule for an AR/VR mode of instruction using the AR/VR models.

* * * * *